(12) United States Patent
King (10) Patent No.: US 12,226,869 B2
(45) Date of Patent: Feb. 18, 2025

(54) MACHINING FIXTURE POSITIONING SWITCH

(71) Applicant: Raytheon Technologies Corporation, Farmington, CT (US)

(72) Inventor: Christopher R. King, Terryville, CT (US)

(73) Assignee: RTX Corporation, Farmington, CT (US)

( * ) Notice: Subject to any disclaimer, the term of this patent is extended or adjusted under 35 U.S.C. 154(b) by 400 days.

(21) Appl. No.: 17/683,545

(22) Filed: Mar. 1, 2022

(65) Prior Publication Data

US 2022/0305600 A1 Sep. 29, 2022

Related U.S. Application Data

(60) Provisional application No. 63/166,491, filed on Mar. 26, 2021.

(51) Int. Cl.
*B23Q 3/00* (2006.01)
*B23Q 3/06* (2006.01)
(Continued)

(52) U.S. Cl.
CPC ............. *B23Q 3/007* (2013.01); *B23Q 3/063* (2013.01); *B23Q 3/082* (2013.01); *H01H 13/14* (2013.01);
(Continued)

(58) Field of Classification Search
CPC ........ B23Q 3/007; B23Q 3/063; B23Q 3/082; B23Q 2703/04; B23Q 2716/00; B23Q 2717/00; B23Q 3/00; B23Q 3/06; B23Q 3/08; H01H 13/14; H01H 3/16; B24B 19/14; B24B 49/10; B24B 47/22
See application file for complete search history.

(56) References Cited

U.S. PATENT DOCUMENTS 3,862,389 A 1/1975 Lowe
4,694,130 A 9/1987 Kitzmann et al.
(Continued)

FOREIGN PATENT DOCUMENTS

EP 3419034 A1 12/2018
GB 1396129 A 6/1975
(Continued)

OTHER PUBLICATIONS

European Search Report dated Feb. 18, 2022 for European Patent Application No. 21193134.0.
(Continued)

*Primary Examiner* — Lheiren Mae A Caroc
(74) *Attorney, Agent, or Firm* — Bachman & LaPointe, P.C.

(57) ABSTRACT

A switch housing body has a base and a sidewall having an axis and extending from the base to a rim and having a pair of axial slots. A switch cap has: a cap body having a top web; and a sidewall extending from the top web to a rim and having a pair of holes. A shaft passes through the pair of axial slots and pair of holes. A spring biases the cap axially away from the housing from a compressed condition to an extended condition. A cap electrical contact and a housing electrical contact have an electrically closed condition at the compressed condition.

20 Claims, 7 Drawing Sheets

(51) Int. Cl.
*B23Q 3/08* (2006.01)
*H01H 13/14* (2006.01)
(52) U.S. Cl.
CPC ...... *B23Q 2703/04* (2013.01); *B23Q 2716/00* (2013.01); *B23Q 2717/00* (2013.01)

(56) References Cited

U.S. PATENT DOCUMENTS

| | | | |
|---|---|---|---|
| 5,929,765 | A | 7/1999 | Urech et al. |
| 7,498,538 | B1 | 3/2009 | Tittle |
| 10,025,288 | B2 | 7/2018 | Bickerstaff et al. |
| 10,199,185 | B2 | 2/2019 | Carrea |
| 10,227,874 | B2 | 3/2019 | Heinrich et al. |
| 2012/0175055 | A1 | 7/2012 | Fessler-Knobel et al. |
| 2019/0066943 | A1* | 2/2019 | Augustin ............. H01H 13/023 |

FOREIGN PATENT DOCUMENTS

| | | |
|---|---|---|
| GB | 2458738 A | 10/2009 |
| KR | 20120003022 U | 5/2012 |

OTHER PUBLICATIONS

Extended European Search Report dated Apr. 5, 2024 for European Patent Application No. 24151040.3.

* cited by examiner

MACHINING FIXTURE POSITIONING SWITCH

CROSS-REFERENCE TO RELATED APPLICATION

Benefit is claimed of U.S. Patent Application No. 63/166,491, filed Mar. 26, 2021, and entitled "Machining Fixture Positioning Switch", the disclosure of which is incorporated by reference herein in its entirety as if set forth at length.

BACKGROUND

The disclosure relates to gas turbine engines. More particularly, the disclosure relates to machining of metallic components (parts or elements) such as blades and vanes.

Gas turbine engines (used in propulsion and power applications and broadly inclusive of turbojets, turboprops, turbofans, turboshafts, industrial gas turbines, and the like) typically include precision-machined cast parts.

For example, with blades and vanes the contours of the airfoil are roughly cast and then precision ground.

In order to grind features on the airfoil, the part is located/registered in a grinding fixture to prevent movement during machining. The grinding fixture has at least six datum features for the part to be fully constrained during a high-force grind operation. The part is clamped to the fixture for machining.

Part misloading to the fixture is a frequent problem for blade/vane programs. In one example, proper part loading relies on an operator checking with a shim to ensure the part is fully loaded on the fixture. Often, the operator misloads the part and doesn't verify all datum locations for proper part seating.

Also, during the grind operation the forces from the grinding tool (e.g., grinding wheel) on the part may lift the part off of the fixture causing the ground part to be out of spec. This nonconformity may only substantially later be detected (e.g., caught in an inspection immediately post-grinding or yet later). Depending on circumstances, the inspection may not reveal the cause of the nonconformity. This may be significant if multiple grinding steps are performed in successive fixtures. For example, the part may be inspected at an in-process coordinate measuring machine (CMM) after a few operations so as to prevent escapes. Such inspection doesn't prevent nonconformities or scrap. Thus, the misloading without operator knowledge of root cause results in unknown scrap quantities or quality nonconformance (QN) submission.

SUMMARY

One aspect of the disclosure involves a switch having a housing having a housing body comprising a base and a sidewall. The sidewall has an axis and extends from the base to a rim and has: an outer diameter surface having an external thread; and a pair of axial slots. The switch has a cap having a cap body having: a top web; and a sidewall extending from the top web to a rim and having a pair of holes. The cap has a shaft passing through the pair of axial slots and pair of holes. The cap is biased axially away from the housing along an axial range of motion from a compressed condition to an extended condition. A cap electrical contact and a housing electrical contact are respectively on the cap and the housing and have an electrically closed condition at the compressed condition.

In a further embodiment of any of the foregoing embodiments, additionally and/or alternatively, the housing body comprises stainless steel.

In a further embodiment of any of the foregoing embodiments, additionally and/or alternatively, the cap body comprises stainless steel.

In a further embodiment of any of the foregoing embodiments, additionally and/or alternatively, the housing electrical contact is mounted to the housing body sidewall rim and the cap electrical contact is mounted to an underside of the cap body top web. Respective electrical leads for the housing electrical contact and cap electrical contact pass through respective holes in the housing body.

In a further embodiment of any of the foregoing embodiments, additionally and/or alternatively, a spring biases the cap axially away from the housing along the axial range of motion from the compressed condition to the extended condition.

In a further embodiment of any of the foregoing embodiments, additionally and/or alternatively, the spring is a frustoconical coil spring.

In a further embodiment of any of the foregoing embodiments, additionally and/or alternatively, the cap further comprises a stem having a transverse hole, the shaft passes through the transverse hole, and the spring bears against the stem.

In a further embodiment of any of the foregoing embodiments, additionally and/or alternatively, a machining fixture for holding a part to be machined. The machining fixture including a plurality of the switches and further comprising a body having a plurality of holes into which the plurality of switches are respectively threaded.

In a further embodiment of any of the foregoing embodiments, additionally and/or alternatively, the machining fixture of further comprises one or more clamps for holding the part in an installed condition compressing the plurality of switches.

In a further embodiment of any of the foregoing embodiments, additionally and/or alternatively, the one or more clamps are hydraulic clamps.

In a further embodiment of any of the foregoing embodiments, additionally and/or alternatively, the machining fixture further comprises means for displaying respective states of the plurality of switches.

In a further embodiment of any of the foregoing embodiments, additionally and/or alternatively, a method for using the machining fixture comprises: installing a part to the machining fixture, the installing depressing the plurality of switches to their respective compressed conditions; and machining the installed part.

In a further embodiment of any of the foregoing embodiments, additionally and/or alternatively, the method of further comprises displaying respective states of the plurality of switches.

In a further embodiment of any of the foregoing embodiments, additionally and/or alternatively, the machining is responsive to displayed closed state of all switches of the plurality of switches.

A further aspect of the disclosure involves, a fixture for processing a part. The fixture comprises: a body having a plurality of threaded holes. A plurality of switches have: a housing body mounted in a respective associated hole of the plurality of threaded holes; and a part-engaging member for contacting the part in an installed condition of the part and mounted to the housing body for axial movement between a compressed condition and an extended condition. The part-engaging member is biased from the compressed condition toward the extended condition. Each switch has a housing body electrical contact and a part-engaging member electrical contact for contacting the housing body electrical contact in the compressed condition. At least one clamp holds the part in the installed condition.

In a further embodiment of any of the foregoing embodiments, additionally and/or alternatively, the at least one clamp comprises a pair of hydraulic clamps.

In a further embodiment of any of the foregoing embodiments, additionally and/or alternatively, the fixture further comprises means for displaying respective states of the plurality of switches.

In a further embodiment of any of the foregoing embodiments, additionally and/or alternatively, a method for using the fixture comprises: installing a part to the fixture, the installing depressing the plurality of switches to their respective compressed conditions; and machining the installed part.

In a further embodiment of any of the foregoing embodiments, additionally and/or alternatively, the method of further comprises displaying respective states of the plurality of switches.

In a further embodiment of any of the foregoing embodiments, additionally and/or alternatively, the machining is responsive to displayed closed states of all switches of the plurality of switches.

The details of one or more embodiments are set forth in the accompanying drawings and the description below. Other features, objects, and advantages will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
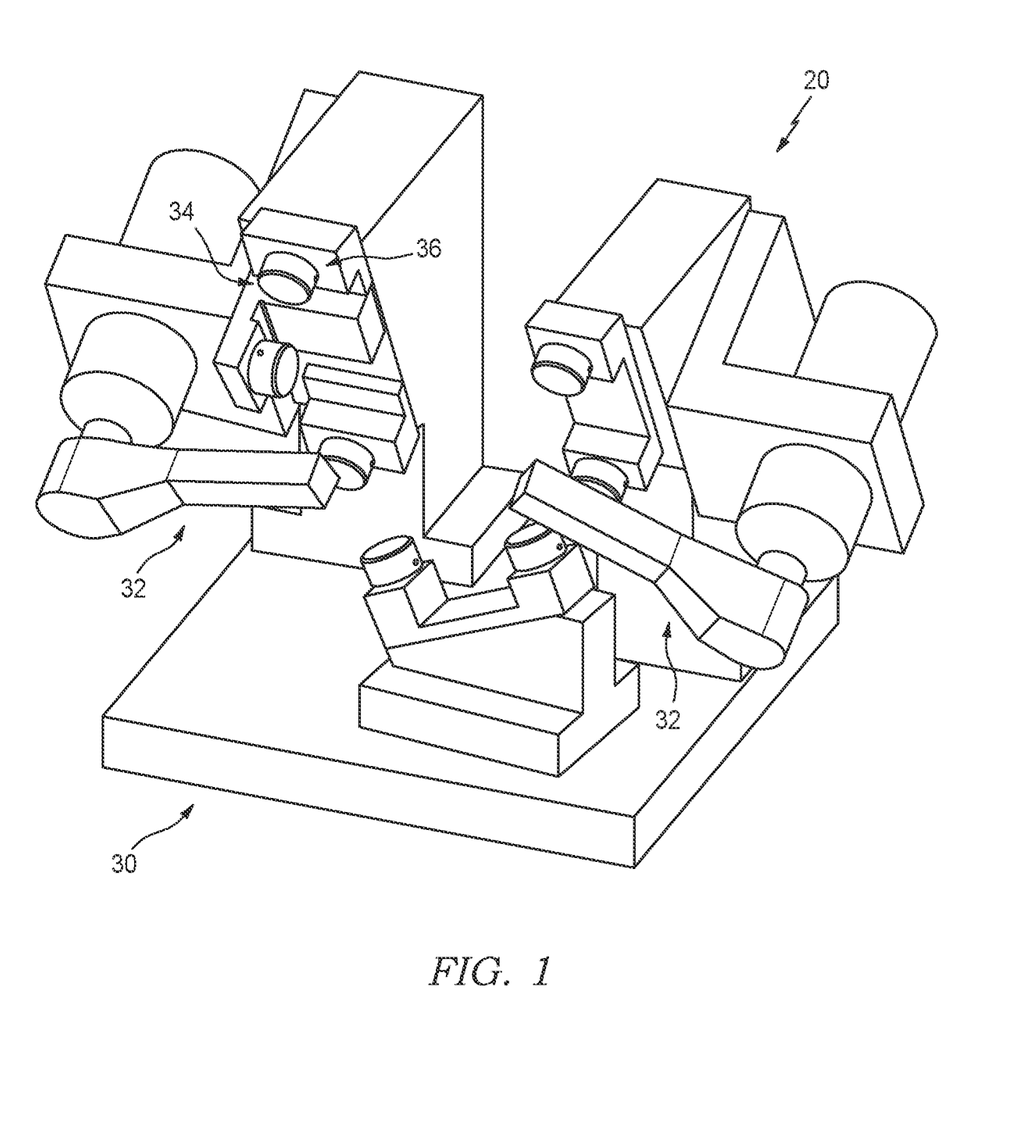
FIG. 1 is a first view of a machining fixture.
Figure 3:
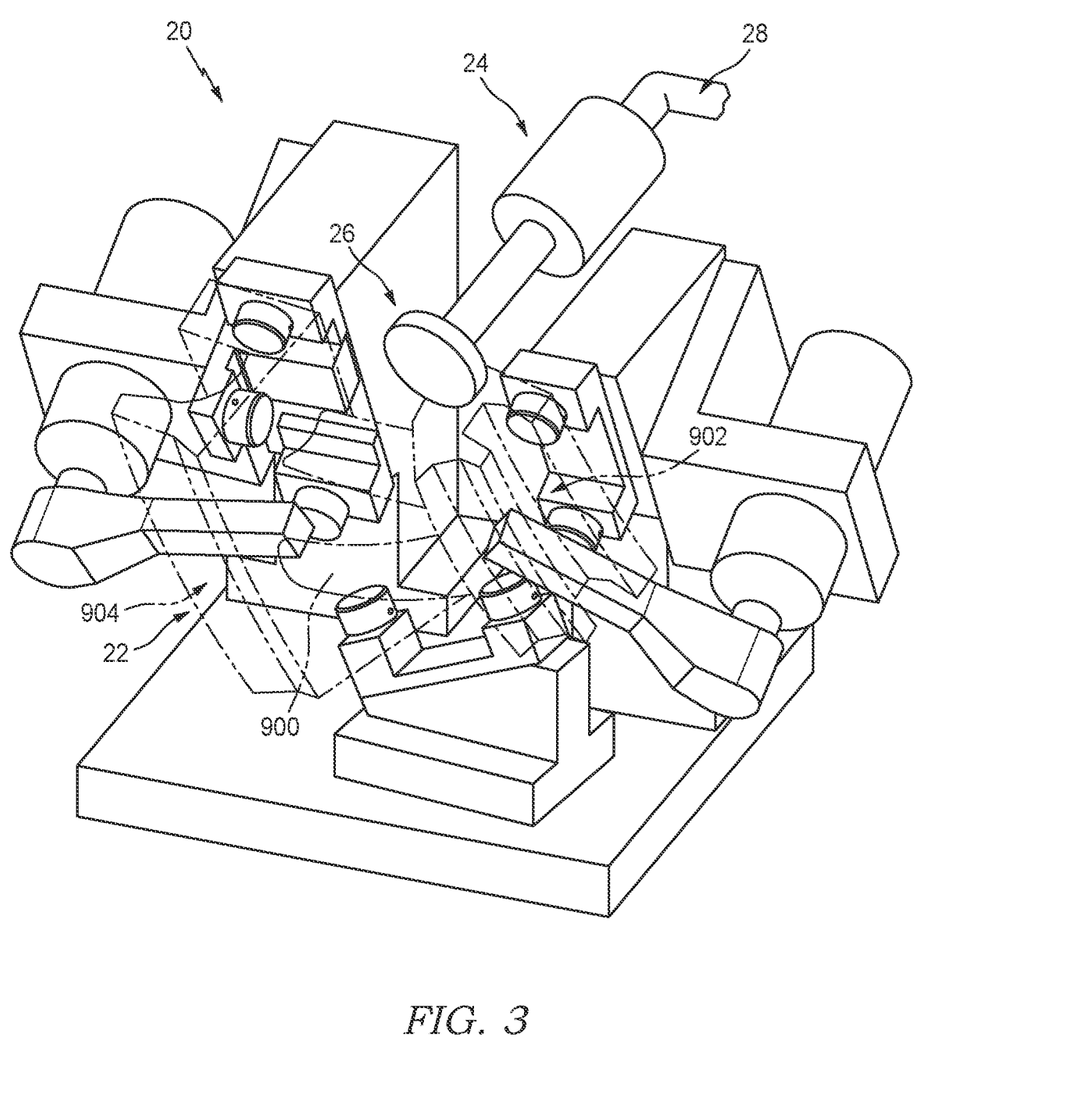
FIG. 3 is a view of the machining fixture holding a part shown in broken lines.

FIG. 1 shows a fixture (nest) 20 for holding a part 22 (FIG. 3) in position during an operation such as machining. FIG. 3 further schematically shows a machine tool 24. An example tool 24 is a rotary grinding tool (e.g., having a bit 26 such as an abrasive grinding wheel or a quill). The tool 24 may be manipulated/maneuvered via an actuator 28 such as an industrial robot (e.g., a six-axis robot). Alternative tools include electro-discharge machining (EDM) tools with associated electrodes/dies.

The example part 22 is a gas turbine engine component. The example gas turbine engine component is a vane cluster having a plurality of airfoils 900 extending between an inner diameter (ID) platform or shroud 902 and an outer diameter (OD) shroud 904. For a typical original manufacture machining process, the part consists of an alloy substrate (e.g., Ni superalloy or Ti alloy). In alternative repair or other processes, the substrate may be coated (e.g., with corrosion coatings, thermal and/or environmental barrier coatings, and the like).

The fixture 20 (FIG. 2) is a complex assembly which may comprise a body 30 and one or more movable engagement/securing members 32 such as clamps for holding the part in place in the fixture. Example clamps are hydraulic clamps or pneumatic clamps (e.g., linear hydraulic clamps or linear pneumatic clamps).

The fixture body 30 (FIG. 2) defines a plurality of contact points with the part. At least some of these contact points are formed by part-contacting elements 34 of respective switches 36. The switches are mounted to a main body structure 38 (e.g., a metal frame) of the fixture body. In the example: two contact points are on a first axial end face of the platform 902; another two are on a corresponding axial end face of the shroud 904; a fifth is on a first circumferential end face of the platform; a sixth is on the corresponding first circumferential end face of the shroud; and a seventh is on an outer diameter (OD) rim surface of the shroud 904.

Figure 2:
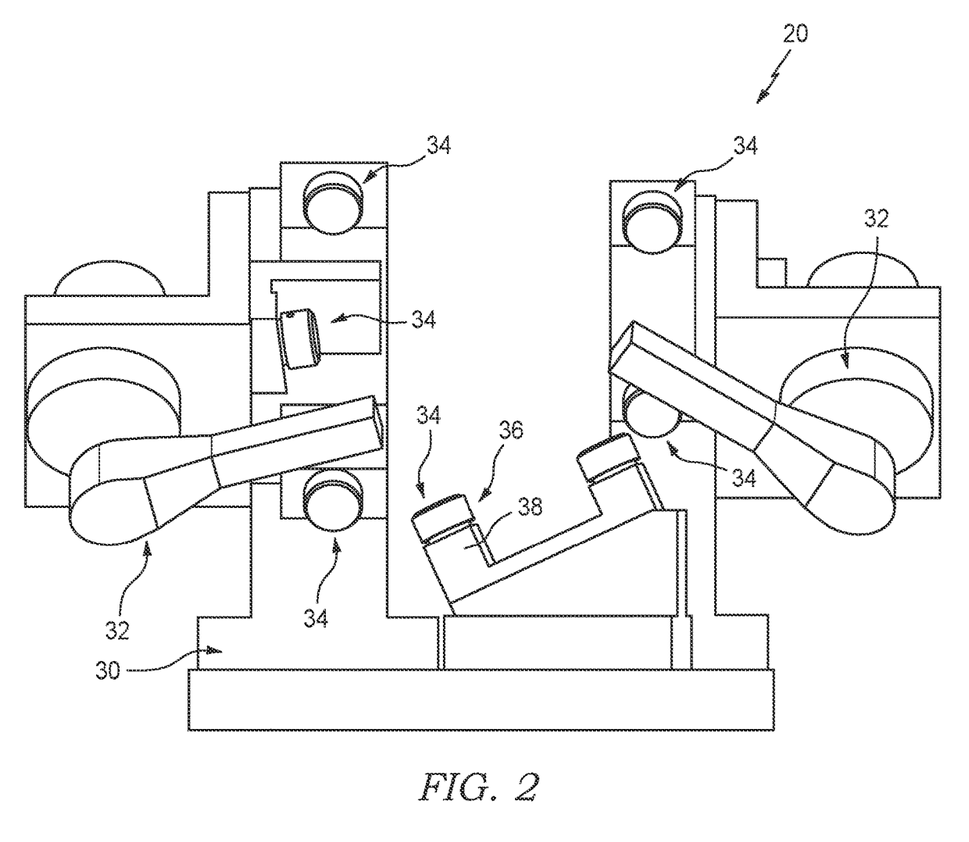
FIG. 2 is a second view of the machining fixture.

The clamps engage respective internal axial-extending faces of the platform and shroud to draw the part against the first four contact points (formed by part-contacting elements 34).

Figure 4:
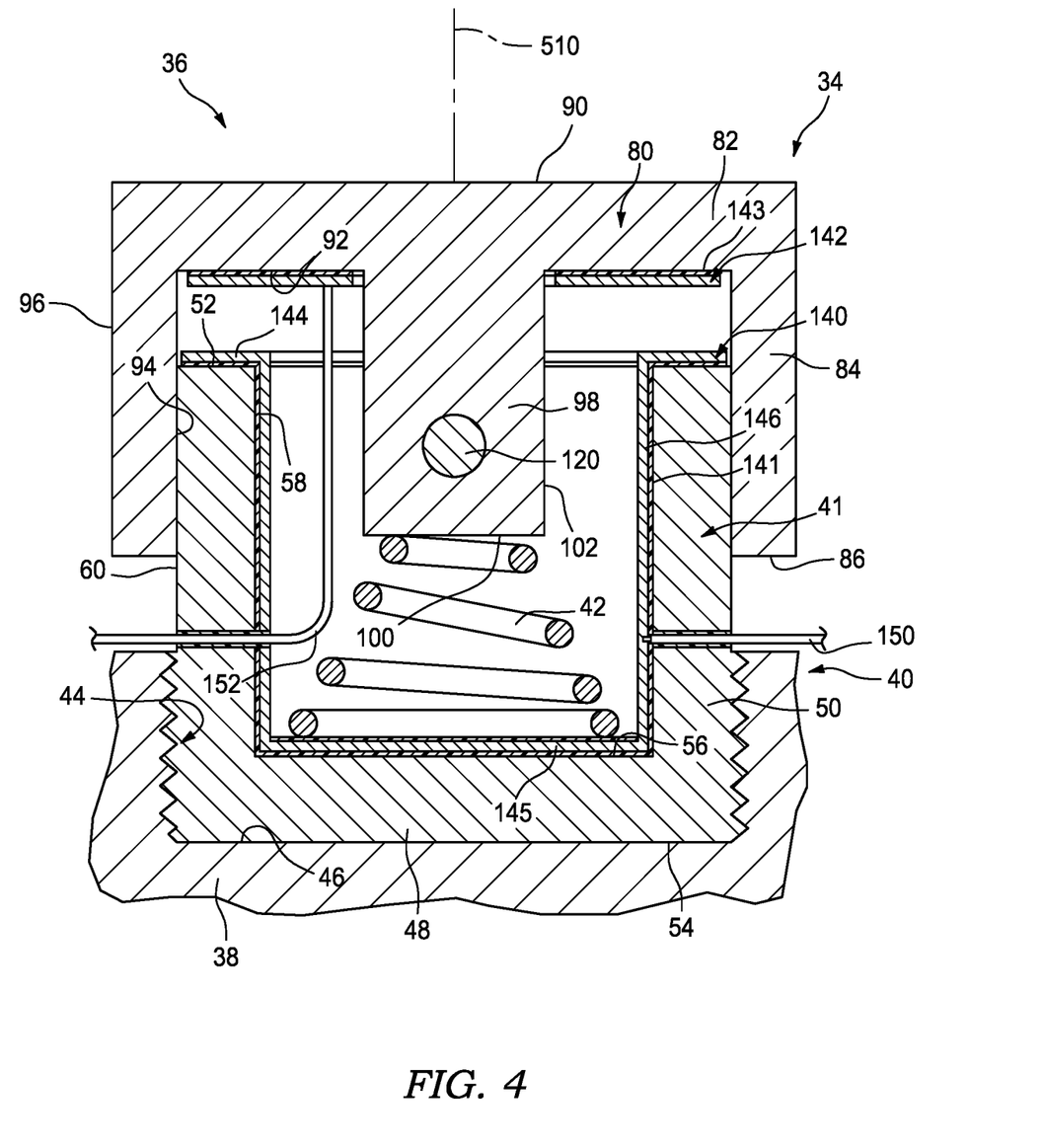
FIG. 4 is a first central longitudinal sectional view of a positioning switch of the fixture in an extended condition.
Figure 5:
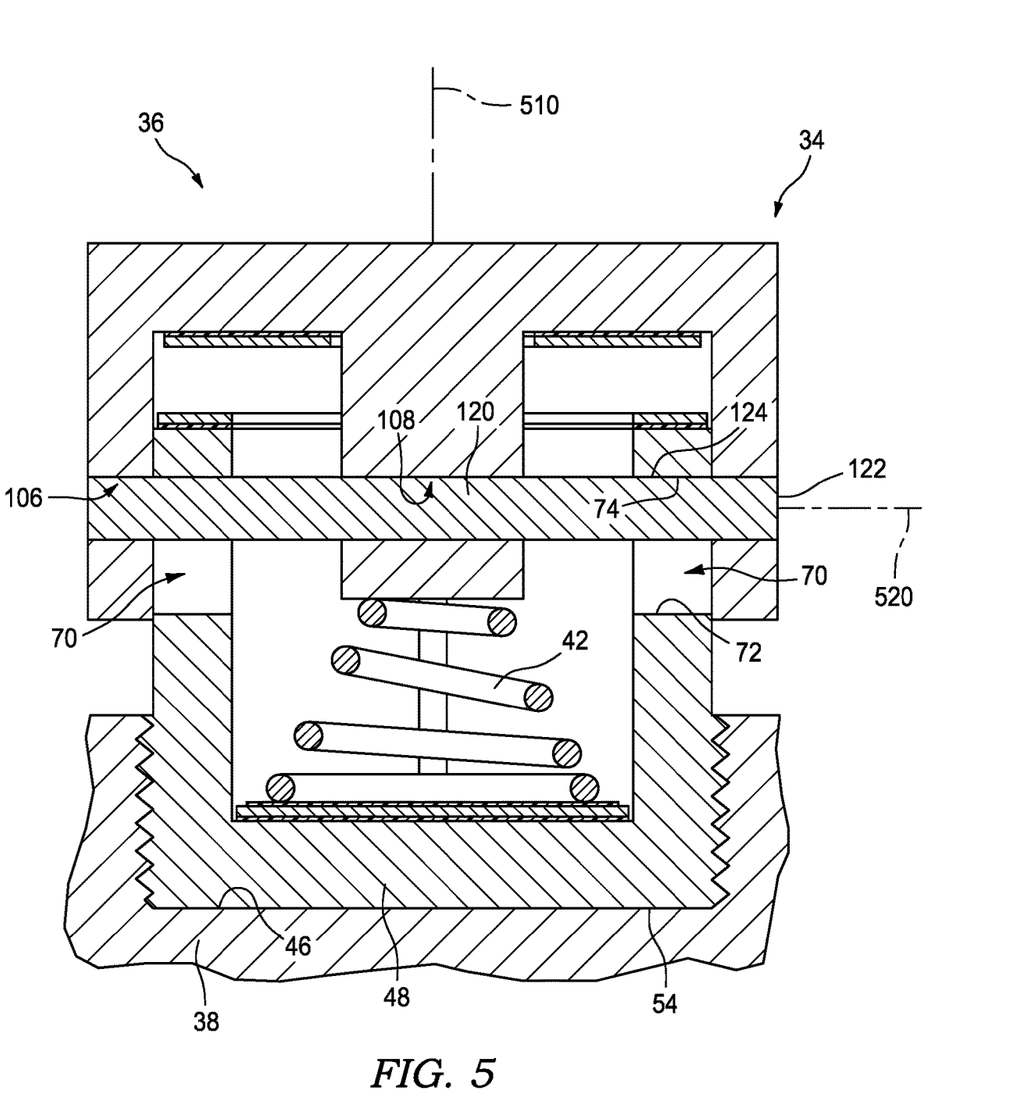
FIG. 5 is a second central longitudinal sectional view of the positioning switch orthogonal to FIG. 4.

The example switches 36 (FIG. 4) each comprise a housing 40 mounted to the main body structure 38 and said part-engaging element 34 mounted to the associated housing 40 for an axial range of motion between a compressed/contracted condition (FIG. 6) and an extended condition (FIGS. 4&5). The part-engaging element is biased away from the housing toward the extended condition from the compressed condition. An example bias is provided by one or more compliant/yielding biasing members such as springs 42.

In the example configuration, the housing 40 has a housing body 41 (e.g., metallic such as a single alloy piece such as a stainless steel) threaded into the main body structure 38. To this end, for each switch 36, the main body structure 38 has an internally-threaded compartment or hole 44 extending from a base surface 46 to an open outer end.

The housing body 41 itself is generally cylindrically cup-shaped having a base 48 and a sidewall 50 extending from the base 48 to a rim 52. The base 48 has an underside 54 and an inboard/interior surface 56. The sidewall has an inner diameter (ID) surface 58 and an externally threaded outer diameter (OD) surface 60. In the installed condition, the sidewall external thread is mated to the hole 44 internal thread. As is discussed further below, the sidewall includes a central longitudinal axis 510 shared with the hole and with the example part-contacting element when installed. The sidewall includes a pair of diametrically opposed axial (axially elongate) slots 70 (FIG. 5). The example slots are radial through-slots extending between the sidewall ID and OD surfaces but have respective lower ends 72 and upper ends 74 (i.e., not extending to the sidewall rim).

The example part-contacting element 34 is shown as a cap for the housing. The example cap is a cap assembly comprising a cap body 80 (e.g., metallic such as a single alloy piece such as a stainless steel) having a top web 82 and a sidewall 84 extending (depending) from the top web 82 to a lower rim 86.

The top web 82 has a top (outer) surface 90 and an underside 92. The sidewall 84 has an inner diameter (ID) surface 94 and an outer diameter (OD) surface 96.

The example cap body 80 also has a central shaft or stem 98 depending from the top web underside to a lower end 100 and having an outer diameter (OD) surface 102.

The cap assembly further includes a pin or shaft 120 mounted to the cap body and passing through the housing slots. The cooperation between the pin and slots serves as a stop mechanism to provide a stop the extended condition. The example pin 120 (e.g., a single alloy piece such as a stainless steel) passes through two diametrically opposite holes 106 in the cap body sidewall 84 and a transverse hole 108 in the cap stem.

The example pin 120 has a pair of ends 122 and an outer diameter (OD) surface 124 relative to a pin axis 520 shared with the holes 106 and 108 when installed. The pin may have an interference relation with the cap body at one or more of those holes.

The switch further comprises a pair of electrical contacts 140, 142. The example housing electrical contact 140 is on the rim of the housing body. The example cap contact 142 is on the underside of the web. The contacts (e.g., each a single alloy piece such as brass) may be secured in place such as via adhesive 141, 143 (e.g., epoxy which also serves as an electrical insulator). Alternative insulators may be pre-formed (e.g., cut from plastic or elastomeric sheet). Alternative contacts may be thin laminates with an electrically insulative layer separating a metallic conductor from the associated body.

The example cap contact 142 consists of or comprises an annulus. The example housing contact 140 comprises an annular upper portion 144 on the housing rim, a circular base 145 atop the housing base, and legs 146 joining the base and extending along the housing sidewall.

Electrical conductors (leads) 150, 152 (e.g., wires) may extend from the contacts and penetrate the housing body to connect to associated electronics (discussed below). In the basic implementation, these may be copper or other wires soldered to the contacts. The leads may proceed to electrical connectors for ultimate connection with further wiring components.

Figure 6:
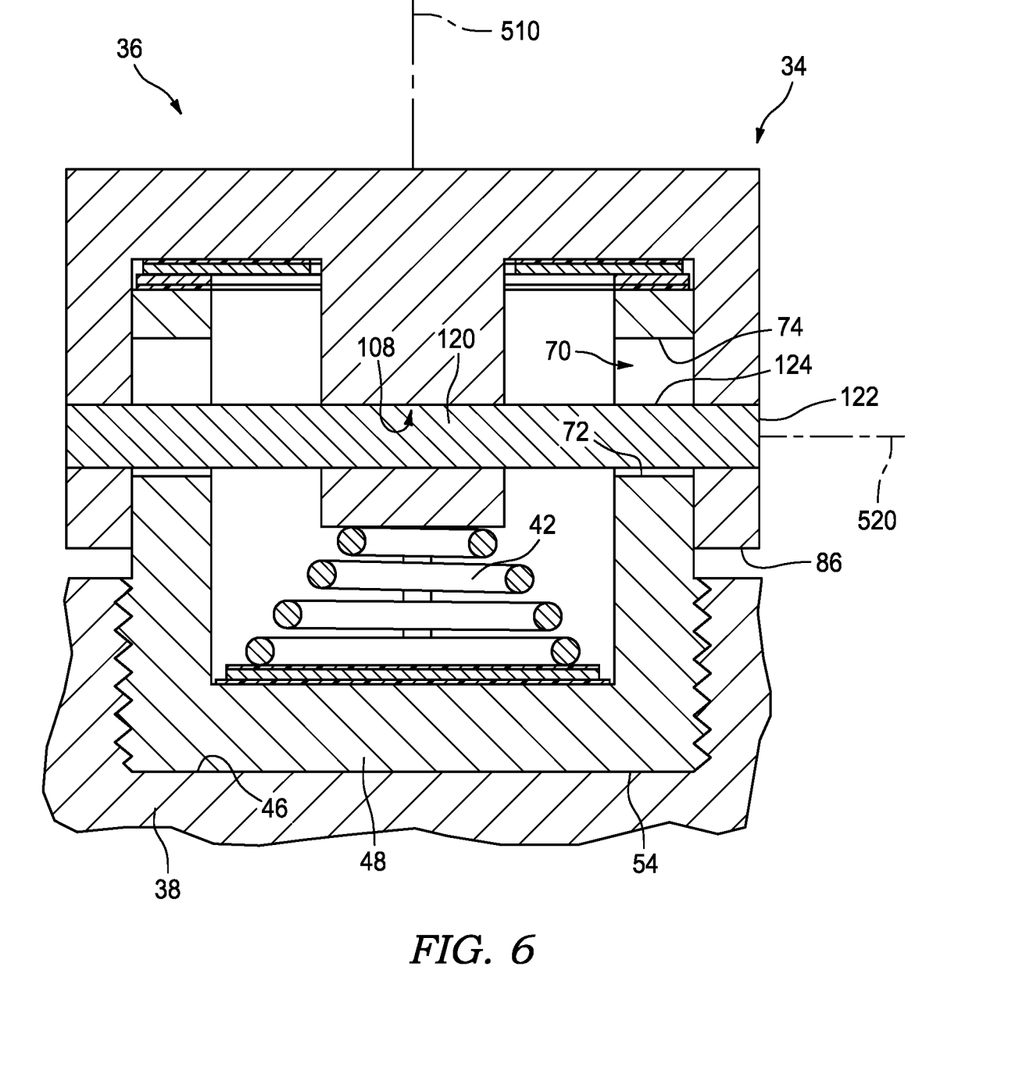
FIG. 6 is a central longitudinal sectional view of the switch of FIG. 5 in a compressed condition.

FIG. 6 shows the compressed condition. In this condition, the contacts 140, 142 are contacting each other and acting as a stop on further compressive movement of the cap. The pin 120 is close to the slot lower ends 72 but clear of them so that the precise position is determined by contact at the contacts 140, 142. FIG. 5 shows an extended condition wherein there is a gap between the contacts 140, 142 and wherein the pin 120 contacts the slot upper ends 74 to serve as a stop on further extensive movement. Throughout this range of motion, an upper portion of the housing sidewall is telescoped within the cap sidewall with housing sidewall OD surface in contact with cap sidewall ID surface.

The dimensional tolerances of housing and cap may be selected so that there is sufficient circumferential contact to seal the interior of the switch. This sealing prevents infiltration of particulates (e.g., machining debris) but also liquids such as coolant or cutting fluid which may electrically interfere with operation (e.g., by bridging contacts and causing false closed circuits or by providing an insulative effect and causing false open circuits). To balance sealing with binding, the dimensional tolerances should limit any friction to below what the biasing member 42 can overcome.

The example switch manufacture process involves manufacturing the housing body by machining from rod stock. The cap body may also be machined from rod stock. The pin may be cut from rod stock or otherwise machined. The slots may be machined (e.g., via end mill or the like). Similarly, the cap holes may be drilled (e.g., via a single drilling plunge). The thread may be die cut.

The contacts may be made via stamping or laser cutting from sheet stock. The contacts may be assembled to the housing body and cap body via insertion after pre-application of epoxy. Passageways for the wires may be formed in the housing body such as via drilling.

The wires may be attached to the contacts via soldering. The assembly process may pass the wires through the respective wire holes and seal the holes such as via a silicone or other sealant.

In final assembly, the biasing member 42 (e.g., spring) may be put in place and held via gravity with the housing body upright. The example spring is a frustoconical conical coil spring (e.g., alloy such as stainless steel) so that the spring base fills the base of the housing compartment to center the spring. The narrow spring upper/distal end is dimensioned to engage the end of the cap body stem. Alternative biasing members include leaf springs, wave springs, and the like and may include plastics instead of metal and may include compression of an elastomer. The cap may be put in place and depressed sufficiently to align its holes 106, 108 with the housing body slots 70 whereupon the pin may be pressed through.

Additional component materials and manufacture techniques and assembly techniques may be otherwise conventional.

Figure 7:
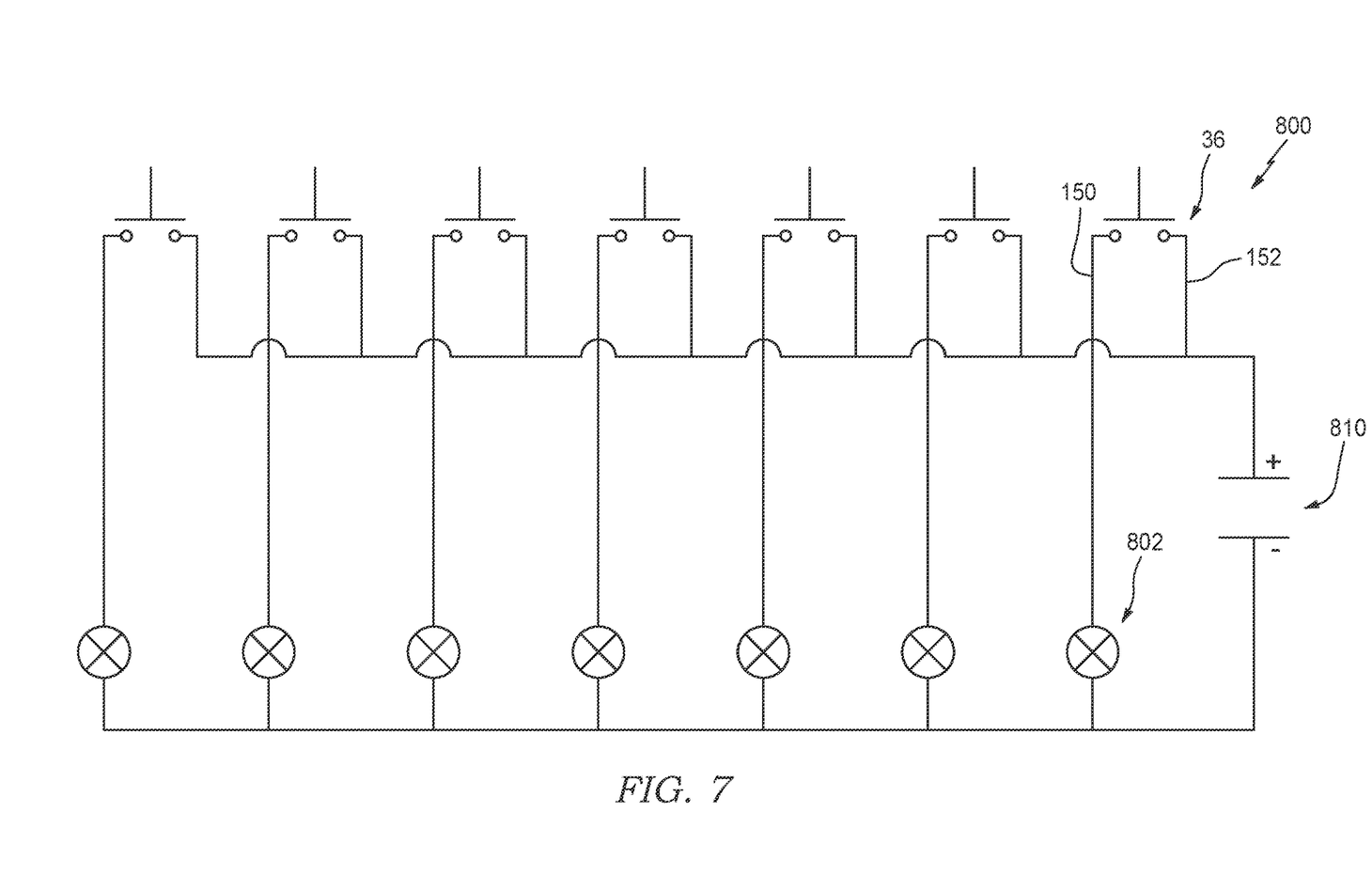
FIG. 7 is a schematic view of an electrical system including the switches.

FIG. 7 schematically shows an electrical system 800 coupled to multiple pairs of the wires 150, 152 and to a power source 810 (e.g., battery, external factory power, and the like). The system may have display means 802 for displaying switch status. A simple example of display means is a light such as an LED light for each switch. Depending upon implementation, a simplest configuration directly wires each light to an associated switch via the power source so that the light lights when the switch is closed. Alternative electronics may be provided to light the lights when the switch is open. Yet alternative display means include flat panel displays where switch state is displayed via icons or the like.

In use, as the part is loaded (by technician hand or handling robot) into the nest and clamped, the part will compress the caps against their bias (e.g., spring load). If properly seated, the respective contact of the switches will establish electrical contact. This causes display of condition state.

The use of "first", "second", and the like in the following claims is for differentiation within the claim only and does not necessarily indicate relative or absolute importance or temporal order. Similarly, the identification in a claim of one element as "first" (or the like) does not preclude such "first" element from identifying an element that is referred to as "second" (or the like) in another claim or in the description.

One or more embodiments have been described. Nevertheless, it will be understood that various modifications may be made. For example, when applied to an existing baseline part or fixture configuration, details of such baseline may influence details of particular implementations. Accordingly, other embodiments are within the scope of the following claims.

What is claimed is:

1. A switch comprising:
   a housing having a housing body comprising:
   a base; and
   a sidewall having an axis and extending from the base to a rim and having:

an outer diameter surface having an external thread; and a pair of axial slots;

a cap biased axially away from the housing along an axial range of motion from a compressed condition to an extended condition, the cap having:

a cap body having:

a top web; and a sidewall extending from the top web to a rim and having:

a pair of holes; and a shaft passing through the pair of axial slots and pair of holes; and a cap electrical contact and a housing electrical contact respectively on the cap and the housing and having an electrically closed condition at the compressed condition.

2. The switch of claim 1 wherein:

the housing body comprises stainless steel.

3. The switch of claim 1 wherein:

the cap body comprises stainless steel.

4. The switch of claim 1 wherein:

the housing electrical contact is mounted to the housing body sidewall rim;

the cap electrical contact is mounted to an underside of the cap body top web; and respective electrical leads for the housing electrical contact and cap electrical contact pass through respective holes in the housing body.

5. The switch of claim 1 wherein:

a spring biases the cap axially away from the housing along the axial range of motion from the compressed condition to the extended condition.

6. The switch of claim 5 wherein:

the spring is a frustoconical coil spring.

7. The switch of claim 6 wherein:

the cap further comprises a stem having a transverse hole; the shaft passes through the transverse hole; and the spring bears against the stem.

8. A machining fixture for holding a part to be machined, the machining fixture including a plurality of switches of claim 1 and further comprising:

a body having a plurality of holes into which the plurality of switches are respectively threaded.

9. The machining fixture of claim 8 further comprising:

one or more clamps for holding the part in an installed condition compressing the plurality of switches.

10. The machining fixture of claim 9 wherein:

the one or more clamps are hydraulic clamps.

11. The machining fixture of claim 8 further comprising:

means for displaying respective states of the plurality of switches.

12. A method for using the machining fixture of claim 8, the method comprising:

installing a part to the machining fixture, the installing depressing the plurality of switches to their respective compressed conditions; and machining the installed part.

13. The method of claim 12 further comprising:

displaying respective states of the plurality of switches.

14. The method of claim 12 wherein:

the machining is responsive to displayed closed state of all switches of the plurality of switches.

15. A fixture for processing a part, the fixture comprising:

a body having a plurality of threaded holes;

a plurality of switches having:

a housing body mounted in a respective associated hole of the plurality of threaded holes; and a part-engaging member for contacting the part in an installed condition of the part and mounted to the housing body for axial movement between a compressed condition and an extended condition, the part-engaging member biased from the compressed condition toward the extended condition;

a housing body electrical contact; and a part-engaging member electrical contact for contacting the housing body electrical contact in the compressed condition; and at least one clamp for holding the part in the installed condition.

16. The fixture of claim 15 wherein:

the at least one clamp comprises a pair of hydraulic clamps.

17. The fixture of claim 15 further comprising:

means for displaying respective states of the plurality of switches.

18. A method for using the fixture of claim 15, the method comprising:

installing a part to the fixture, the installing depressing the plurality of switches to their respective compressed conditions; and machining the installed part.

19. The method of claim 18 further comprising:

displaying respective states of the plurality of switches.

20. The method of claim 19 wherein:

the machining is responsive to displayed closed states of all switches of the plurality of switches.

\* \* \* \* \*